United States Patent
Welb et al.

(10) Patent No.: US 10,882,015 B2
(45) Date of Patent: Jan. 5, 2021

(54) SCREW MACHINE AND METHOD FOR THE PROCESSING OF MATERIAL TO BE PROCESSED

(71) Applicant: Coperion GmbH, Stuttgart (DE)

(72) Inventors: Sören Welb, Ilsfeld (DE); Ulrich Conrad, Elze (DE); Peter Munkes, Stuttgart (DE)

(73) Assignee: Coperion GmbH, Stuttgart (DE)

( * ) Notice: Subject to any disclaimer, the term of this patent is extended or adjusted under 35 U.S.C. 154(b) by 310 days.

(21) Appl. No.: 15/764,655

(22) PCT Filed: Sep. 27, 2016

(86) PCT No.: PCT/EP2016/072945
§ 371 (c)(1),
(2) Date: Mar. 29, 2018

(87) PCT Pub. No.: WO2017/055260
PCT Pub. Date: Apr. 6, 2017

(65) Prior Publication Data
US 2018/0272297 A1 Sep. 27, 2018

(30) Foreign Application Priority Data
Oct. 1, 2015 (DE) .................. 10 2015 219 033

(51) Int. Cl.
*B01F 15/06* (2006.01)
*B01F 7/00* (2006.01)
(Continued)

(52) U.S. Cl.
CPC .......... *B01F 7/00416* (2013.01); *B01F 7/085* (2013.01); *B01F 15/00175* (2013.01);
(Continued)

(58) Field of Classification Search
CPC ..................................... B29C 48/832
(Continued)

(56) References Cited

U.S. PATENT DOCUMENTS 3,981,653 A * 9/1976 Greenhalgh .......... B29C 48/865
425/113
4,304,537 A * 12/1981 Kirjavainen .......... B29C 44/322
425/113
(Continued)

FOREIGN PATENT DOCUMENTS

| CN | 202 846 846 U1 | 4/2013 |
|---|---|---|
| CN | 204 547 024 U | 8/2015 |

(Continued)

*Primary Examiner* — David L Sorkin
(74) *Attorney, Agent, or Firm* — McGlew and Tuttle, P.C.

(57) ABSTRACT

A screw machine includes an inductive heating device for the processing of material to be processed. The inductive heating device is used to heat the material in a heating zone. In the heating zone, at least one housing portion is made of an electromagnetically transparent material at least partly, the material being non-magnetic and electrically non-conductive, whereas at least one treatment element shaft is made of an electrically conductive material at least partly. During the processing of the material, the inductive heating device generates an alternating magnetic field that produces eddy current losses in the at least one treatment element shaft, the eddy current losses leading to a temperature increase of the at least one treatment element shaft. The material is heated on the at least one heated treatment element shaft, in particular until it melts. The screw machine allows a simple and efficient melting of the material, with the result that a mechanical energy input and a resulting wear of the screw machine can be reduced significantly.

16 Claims, 6 Drawing Sheets

(51) Int. Cl.
  *B29C 48/80* (2019.01)
  *B01F 7/08* (2006.01)
  *B01F 15/00* (2006.01)
  *B29C 45/74* (2006.01)
  *B29C 48/25* (2019.01)
  *B29C 48/40* (2019.01)
  *B29C 48/57* (2019.01)
  *B29C 48/68* (2019.01)
  *B29C 48/54* (2019.01)
  *B29C 48/505* (2019.01)
  *B29C 48/03* (2019.01)

(52) U.S. Cl.
  CPC ...... *B01F 15/00396* (2013.01); *B01F 15/066* (2013.01); *B29C 48/832* (2019.02); *B01F 2015/061* (2013.01); *B01F 2015/062* (2013.01); *B01F 2215/0049* (2013.01); *B29C 45/74* (2013.01); *B29C 48/03* (2019.02); *B29C 48/2564* (2019.02); *B29C 48/2565* (2019.02); *B29C 48/402* (2019.02); *B29C 48/509* (2019.02); *B29C 48/54* (2019.02); *B29C 48/57* (2019.02); *B29C 48/6803* (2019.02)

(58) Field of Classification Search
  USPC .......................................... 366/79, 145, 146
  See application file for complete search history.

(56) References Cited

U.S. PATENT DOCUMENTS

| | | | |
|---|---|---|---|
| 4,678,881 | A * | 7/1987 | Griffith ............... B01F 7/00583 219/631 |
| 2003/0121908 | A1 | 7/2003 | Pilavdzic et al. |
| 2016/0279854 | A1 | 9/2016 | Fitzpatrick |

FOREIGN PATENT DOCUMENTS

| | | |
|---|---|---|
| DE | 1 105 143 B | 4/1961 |
| DE | 35 23 929 A1 | 1/1986 |
| DE | 44 04 031 C1 | 1/1995 |
| DE | 10 2014 206 638 A1 | 10/2015 |
| EP | 2 692 505 A1 | 2/2014 |
| GB | 2 163 630 A | 2/1986 |
| WO | 2005/053 826 A2 | 6/2005 |
| WO | 2015/154973 A1 | 10/2015 |

* cited by examiner

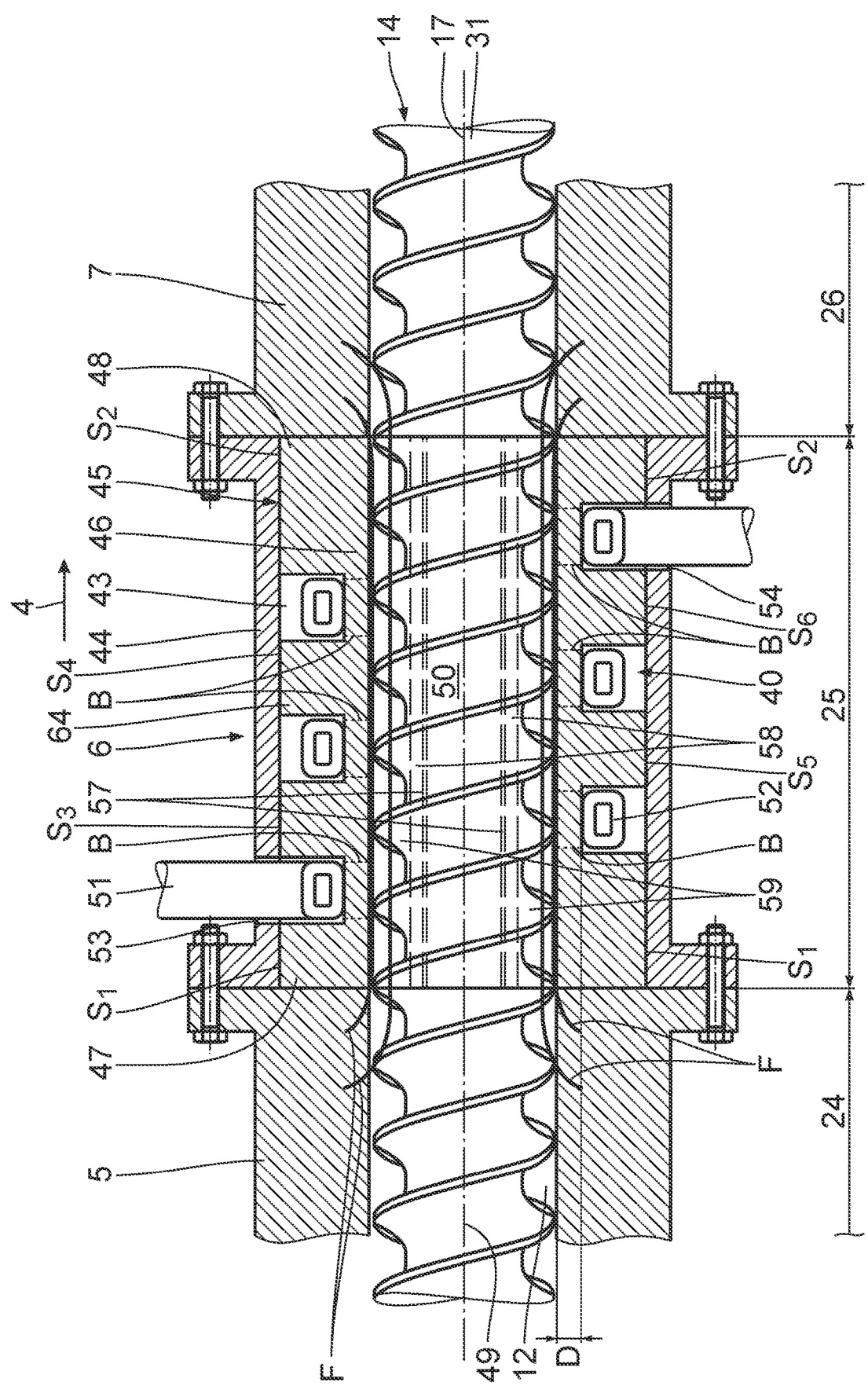

SCREW MACHINE AND METHOD FOR THE PROCESSING OF MATERIAL TO BE PROCESSED

CROSS REFERENCE TO RELATED APPLICATIONS

This application is a United States National Phase Application of International Application PCT/EP2016/072945 filed Sep. 27, 2016 and claims the benefit of priority under 35 U.S.C. § 119 of German Patent Application Serial No. DE 10 2015 219 033.1 filed Oct. 1, 2015, the entire contents of which are incorporated herein by reference.

FIELD OF THE INVENTION

The present invention relates to a screw machine and to a method for the processing of material to be processed.

BACKGROUND OF THE INVENTION

For the processing of plastic material, known screw machines have an inlet zone and a melting or plasticizing zone arranged downstream thereof. In the inlet zone, the plastic material, such as polymer powder or polymer pellets, are fed to the screw machine and conveyed in the direction of the plasticizing zone where the plastic material is molten as a result of a mechanical energy input provided by kneading elements. In this melting process, more than 60% of the total mechanical energy input are usually introduced via the first kneading block. Consequently, very high mechanical forces occur in the plasticizing zone of the screw machine, causing the treatment element shafts to vibrate, which results in a mechanical wear of the treatment elements and the housing.

In order to reduce the required mechanical energy input, heating devices are used.

From DE 44 04 031 C1, a screw machine is known, which has electrically heatable housing portions. The housing portions have a thermally conductive cast insert equipped with a plurality of electrical resistance heating elements. The resistance heating elements are cast into the thermally conductive cast insert at different levels thereof.

From DE 35 23 929 A1 (corresponding to GB 2 163 630 A), it is known to heat the housing portions of an extruder by means of an inductive heating device. To this end, coils are arranged on outer sides of the heatable housing portion by means of a respective iron core. The plastic material to be heated is conveyed through the housing portion and is heated thereby.

DE 1 105 143 A discloses a screw extruder in which two screws running in opposite directions are arranged in a cylinder. The cylinder is surrounded by a heat-resistant coil used for inductive heating of the screw extruder. The cylinder is made of a non-magnetic material, such as non-magnetic iron, whereas the screw consists of a magnetic material. This allows the screws to be heated directly by induction.

From WO 2005/053 826 A2, an apparatus for melting plastic materials is known, the apparatus being designed without a screw to reduce the number of parts being in frictional contact with each other and, consequently, the wear thereof. The apparatus comprises a static mixer, which—in order to melt the plastic material—is heated by ohmic or inductive heating.

SUMMARY OF THE INVENTION

The invention is based on the object of providing a screw machine, which provides a simple and efficient manner of heating material to be processed. In particular, the screw machine is intended to allow a heating of the material until it melts.

This object is achieved according to the invention by a screw machine with a housing, which comprises a plurality of interconnected housing portions arranged in succession in a conveying direction, at least one housing bore formed in the housing, a feed opening leading into the housing bores, at least one treatment element shaft arranged in the at least one housing bore in such a way as to be drivable for rotation about a rotational axis, an inductive heating device configured to form a heating zone, wherein at least one housing portion in the heating zone is made of a non-magnetic and electrically non-conductive material at least partly, the at least one treatment element shaft comprises an electrically conductive material at least in the heating zone. The material to be processed can be heated much easier and more effectively if the inductive heating device interacts with the at least one treatment element shaft in the heating zone and not with the at least one housing portion or the housing portions as the at least one treatment element shaft is in close contact with the material to be processed and is surrounded by the material to be processed over a large surface area thereof. In order to ensure an efficient energy input into the material to be processed, the at least one housing portion in the heating zone is made of an electromagnetically transparent material at least partly, said material being non-magnetic and electrically non-conductive. For the sake of clarity, the at least one housing portion in the heating zone is hereinafter also referred to as heating zone housing portion. The electromagnetically trans-parent material does not interact with the inductive heating device. In particular, the electromagnetically transparent material is non-ferromagnetic. Preferably, a plurality of heating zone housing portions, in particular all heating zone housing portions, are made—in the heating zone—of the electromagnetically transparent material at least partly. Contrary, the at least one treatment element shaft is made of an electrically conductive material in the heating zone at least partly, with the result that the inductive heating device causes eddy currents to be induced in the at least one treatment element shaft, which in turn causes ohmic eddy current losses to develop that lead to a temperature increase of the at least one treatment element shaft. Via the at least one heated treatment element shaft, the energy provided by the inductive heating device is introduced into the material to be processed easily and efficiently and with a minimum of losses. The electrically conductive material is in particular ferrous and ferromagnetic. This allows the at least one treatment element shaft to be heated efficiently by ohmic eddy current losses and hysteresis losses. The material to be processed is in particular a plastic material or a metal material, for example a metallic bulk material.

The electromagnetically transparent material of the at least one heating zone portion is, for example, a non-metal material such as a ceramic and/or fiber-reinforced material. Contrary, the electrically conductive material of the at least one treatment element shaft is in particular a metal material such as steel.

The inductive heating device generates an alternating magnetic field. The alternating magnetic field interacts with the at least one treatment element shaft but not with the at least one heating zone housing portion. The alternating magnetic field causes eddy currents to be induced in the at least one treatment element shaft, the eddy currents resulting in eddy current losses, which—in particular together with hysteresis losses—lead to a temperature increase of the at least one treatment element shaft. Contrary, the at least one heating zone housing portion does not interact with the inductive heating device so the alternating magnetic field does not generate any substantial temperature increase in the at least one heating zone housing portion. As the energy provided by means of the inductive heating device is introduced into the material to be processed via the at least one treatment element shaft, this allows a simple and extremely efficient heating of the material to be processed. As the at least one treatment element shaft is in close contact with the material to be processed and is arranged within the material to be processed, in other words the material to be processed surrounds the at least one treatment element shaft substantially over the entire circumference thereof, the input of energy occurs substantially without losses, thus allowing the material to be processed to be heated by means of the inductive heating device until it melts at least partly. This allows the mechanical forces acting in the screw machine and the resulting wear thereof to be reduced significantly.

In order to generate the alternating magnetic field, the inductive heating device is operable in particular at a frequency f, the frequency f being such that 1 kHz≤f≤50 kHz, in particular 5 kHz≤f≤45 kHz, and in particular 10 kHz≤f≤40 kHz. If the inductive heating device is operated at a frequency f in this first frequency range, a high input of energy into the at least one treatment element shaft is achieved in an efficient manner. As the at least one heating zone housing portion is made of the non-magnetic and electrically non-conductive material, an energy input into the at least one heating zone housing portion is effectively prevented. As an alternative or in addition thereto, the inductive heating device can be operated at a frequency f in a second frequency range, the frequency f being such that 140 kHz≤f≤360 kHz, in particular 150 kHz≤f≤350 kHz, and in particular 160 kHz≤f≤340 kHz. Operating the inductive heating device in the two frequency ranges allows an excitement or heating in various penetration depths. The inductive heating device is operated in the first frequency range and the second frequency range in particular alternately. This provides an efficient manner of ensuring a high energy input.

Preferably, the screw machine is configured as a multi-shaft screw machine, in particular as a twin-shaft screw machine. The multi-shaft screw machine has a plurality of housing bores formed in the housing and associated treatment element shafts arranged in the respectively associated housing bore in such a way as to be drivable for rotation about an associated rotational axis. The treatment element shafts are drivable for rotation in particular in the same direction. The treatment element shafts are preferably configured as closely intermeshing pairs.

A screw machine configured such that the inductive heating device comprises at least one coil that surrounds the at least one treatment element shaft and defines an inner space ensures an efficient input of energy into the at least one treatment element shaft. The coil axis or longitudinal center axis of the at least one coil is arranged substantially towards the rotational axis or the rotational axes of the at least one treatment element shaft. Preferably, a longitudinal center axis of the at least one coil is parallel to the rotational axis of the at least one treatment element shaft. The at least one treatment element shaft is arranged in an inner space of the at least one coil. The at least one coil is therefore arranged in the manner of a Helmholtz coil, with the treatment element shafts forming a core. The field lines of the alternating magnetic field are therefore concentrated in the inner space and in the at least one treatment element shaft so a high energy input into the treatment element shafts is possible in a simple manner. The length of the heating zone in the conveying direction is adjustable via the length of the at least one coil and/or the number of the coils. The length of the at least one coil is adjustable in particular via the number of its windings.

A screw machine configured such that the at least one housing portion in the inner space is exclusively made of the non-magnetic and electrically non-conductive material ensures a high and efficient input of energy into the at least one treatment element shaft in a simple manner. As the at least one heating zone housing portion in the inner space of the at least one coil is made exclusively of the non-magnetic and electrically non-conductive material, the energy provided by the inductive heating device is introduced into the at least one treatment element shaft with a minimum of losses.

A screw machine configured such that between the at least one treatment element shaft and the at least one coil, only a non-magnetic and electrically non-conductive material is arranged ensures a high and efficient input of energy into the at least one treatment element shaft in a simple manner. Magnetic and/or electrically conductive material of the screw machine, which would be located between the at least one coil and the at least one treatment element shaft, would absorb electromagnetic energy provided by the inductive heating device so energy provided by the inductive heating device could only be introduced into the at least one treatment element shaft with a significant amount of losses. This is effectively prevented by the screw machine according to the invention. Preferably, the material of the at least one heating zone housing portion arranged in the inner space is a ceramic and/or fiber-reinforced material, such as an oxide ceramic fiber-reinforced composite. Oxide ceramic fiber-reinforced composites combine positive properties of metals and ceramics, such as electromagnetic transparency, electric and thermal insulating ability, ductile and non-brittle breaking behavior, high tensile and bending stiffness, oxidation and corrosion resistance, high temperature stability up to temperatures above 1300° C., and thermal shock resistance. As the alternating magnetic field of the at least one coil produces only a low energy input into electrically conductive and/or magnetic components outside the inner space, the areas of the at least one heating zone housing portion disposed outside the inner space can be made of an electrically conductive and or magnetic material. Alternatively, the areas of the at least one heating zone housing portion disposed outside the inner space may also be made of a non-magnetic and electrically non-conductive material.

A screw machine configured such that the at least one housing portion comprises an inner sleeve that defines the at least one housing bore in the heating zone at least partly, wherein said inner sleeve is exclusively made of the non-magnetic and electrically non-conductive material, ensures a high and efficient input of energy into the at least one treatment element shaft in a simple manner. As the inner sleeve is made exclusively of the electromagnetically transparent material, the inner sleeve is not heated by the alternating magnetic field. As a result, the energy provided by the inductive heating device is introduced into the at least one treatment element shaft substantially without losses and is converted into heat there. Preferably, the material of the inner sleeve is a ceramic and/or fiber-reinforced material, such as an oxide ceramic fiber-reinforced composite. Oxide ceramic fiber-reinforced composites combine positive properties of metals and ceramics, such as electromagnetic transparency, electric and thermal insulating ability, ductile and non-brittle breaking behavior, high tensile and bending stiffness, oxidation and corrosion resistance, high temperature stability up to temperatures above 1300° C., and thermal shock resistance. As the alternating magnetic field of the at least one coil produces only a low energy input into electrically conductive and/or magnetic components, at least an outer part of the at least one heating zone housing portion can be made of an electrically conductive and/or magnetic material. Alternatively, the outer part may also be made of an electromagnetically transparent material. In particular, the at least one outer part may be made of a ceramic and/or fiber-reinforced material as well. The inner sleeve defines in particular a receiving space at least towards the at least one housing bore. Arranging the at least one coil in the receiving space ensures that the coil is protected by the at least one housing portion and is arranged close to the at least one treatment element shaft.

A screw machine configured such that the at least one housing portion comprises at least one outer part and an inner sleeve, wherein said inner sleeve is supported against the at least one outer part, ensures a high and efficient input of energy into the at least one treatment element shaft in a simple manner. The inner sleeve arranged inside the inner space is supported against the at least one outer part in such a way that the mechanical stability of the inner sleeve is guaranteed. The inner sleeve is preferably supported against the at least one outer part at both ends. In order to increase the mechanical stability, the inner sleeve may additionally be supported against the at least one outer part between the ends thereof The at least one outer part is configured as an outer jacket, for example.

A screw machine configured such that the inner sleeve is supported against the at least one outer part on at least two support positions, in particular on at least three support positions, and in particular on at least four support positions along the at least one rotational axis ensures a high and efficient input of energy into the at least one treatment element shaft in a simple and reliable manner. As the inner sleeve is supported against the outer part on at least two support positions along the at least one rotational axis, the inner sleeve has a high mechanical stability. Therefore, the inner sleeve is able to dissipate forces occurring during processing in particular in a radial direction to the at least one outer part. This effectively prevents the inner sleeve from breaking The inner sleeve is preferably made of a ceramic and/or fiber-reinforced material. The at least one outer part is preferably made of a metal material so the at least one outer part possesses a sufficient stability to absorb forces. Preferably, two support positions are located in the region of the ends of the inner sleeve arranged along the at least one rotational axis.

A screw machine configured such that on an outer side facing the at least one coil, the inner sleeve is formed negatively to the at least one coil ensures a high and efficient input of energy into the at least one treatment element shaft in a simple and reliable manner. As the outer side thereof is formed negatively to the at least one coil, the at least one coil is on the one hand arranged close to the at least one treatment element shaft, with the result that a high and efficient energy input is guaranteed. On the other hand, the inner sleeve forms support positions arranged on the outside in the shape of a helix or, alternatively, a helical support region or support web so the inner sleeve is supported against the at least one outer part over a large surface area thereof so forces acting in this region can be dissipated to the at least one outer part in a simple and reliable manner.

A screw machine configured such that the at least one coil comprises an associated conductor, wherein in a region of the conductor perpendicular to the at least one rotational axis, the inner sleeve (45) has a thickness D, with 5 mm≤D≤50 mm, in particular 10 mm≤D≤40 mm, and in particular 15 mm≤D≤30 mm, ensures a high and efficient input of energy into the at least one treatment element shaft in a simple and reliable manner. The smaller the thickness D of the inner sleeve, the greater and more efficient the energy input into the at least one treatment element shaft, since the conductor of the at least one coil can then be arranged close to the at least one treatment element shaft. Contrary thereto, however, the greater the thickness D, the greater the mechanical stability of the inner sleeve. Between the windings of the conductor, in other words outside the region of the conductor, the thickness D can be such that the inner sleeve is supported against at least one outer part. Between the windings of the conductor, the thickness D may therefore exceed an upper limit for the thickness D in the region of the conductor.

A screw machine configured such that the at least one coil comprises an associated conductor, wherein said conductor has a non-round cross-section, which is formed linearly in relation to the inner sleeve at least partly, ensures a high and efficient input of energy into the at least one treatment element shaft in a simple and reliable manner. As the conductor has a non-round cross-sectional shape, the cross-sectional shape is substantially flat, allowing the conductor or the at least one coil to be arranged close to the at least one treatment element shaft, thus ensuring a high and efficient input of energy. For example, the conductor has a rectangular cross-sectional shape, which may be rounded at the corners, if necessary. As the conductor has a linear cross-sectional shape at least partly, the conductor may be arranged such as to abut against the inner sleeve across a large surface area thereof and may therefore be arranged close to the at least one treatment element shaft. The side of the cross-sectional shape having the greater dimension is arranged such as to face the inner sleeve.

A screw machine configured such that the at least one treatment element shaft comprises a plurality of treatment elements arranged on at least one associated shaft non-rotatably and successively in the conveying direction, wherein said at least one treatment element comprises a metal heating layer, which forms a surface of the at least one treatment element, and wherein said at least one treatment element comprises an insulating layer, which thermally insulates the heating layer from the shaft, ensures a simple and efficient heating of the material to be processed. The at least one treatment element being provided with an insulating layer prevents thermal losses of the at least one heated treatment element in the direction of the shaft, which would then not be available for heating the material to be processed. The insulating layer is made of a ceramic material, for example. The electrically conductive material forms at least the heating layer of the at least one treatment element, the heating layer forming a surface that is in contact with the material to be processed. Preferably, a plurality of treatment elements, in particular all treatment elements in the heating zone are made of the electrically conductive material. The at least one treatment element is configured as a screw element and/or a kneading element. The kneading element may be a single kneading disk or a single-part kneading block made of a plurality of interconnected kneading disks.

The at least one treatment element is made of a composite material, for example. The at least one treatment element being made of the composite material has a number of different properties. The metal material of the outer heating layer ensures a temperature increase of the heating layer caused by the alternating magnetic field, allowing the material to be processed to be heated directly via the heating layer. The insulating layer, which is disposed between the outer heating layer and an inner torque transmitting layer, minimizes the thermal losses as the heat of the heating layer does not get lost in the direction of the inner torque transmitting layer and the shaft on which the at least one treatment element is arranged. The inner torque transmitting layer has a high mechanical stability so a torque of the shaft can be safely transmitted to the at least one treatment element. In particular, the insulating layer ensures that the inner torque transmitting layer is not weakened by thermal losses. The material of the insulating layer is in particular a ceramic material. The at least one treatment element may for example be made of ceramic and metal powders, which are sintered in a corresponding mold at approximately 1,400° C. so as to form a composite material or a composite body. The production of metal ceramic composite bodies is known. Seen in cross-section, in other words perpendicular to the respective rotational axis, the layers have a closed, in particular annular shape and surround the rotational axis of the at least one treatment element shaft, with the result that the insulating layer insulates the heating layer from the shaft across the entire surface thereof. Furthermore, the heating layer has a maximum surface area, thus ensuring a good heat transfer from the heating layer to the material to be processed.

A screw machine configured such that the inductive heating device comprises at least one coil, which is coolable by a cooling device, in particular by a water cooling device, ensures a high input of energy. The at least one coil is heated by ohmic losses. The cooling device dissipates the thermal losses generated in the at least one coil. The at least one coil can therefore be operated at a high power. Preferably, the at least one coil forms a cooling duct itself through which a coolant can flow. The coolant is in particular water. Furthermore, the receiving space can be surrounded by the heating zone housing portion entirely, for example, so the receiving space can be used as a cooling duct. In order to avoid ohmic losses, the coil is in particular made of aluminum or copper.

A screw machine configured such that the inductive heating device comprises at least one coil and an associated energy supply device, wherein said energy supply device provides an alternating voltage and/or an alternating current, in particular with an adjustable frequency and/or an adjustable amplitude, ensures a simple manner of providing an alternating magnetic field by means of the inductive heating device. The energy supply device in particular comprises a frequency converter, which allows a frequency f and/or an amplitude of an alternating voltage and/or of an alternating current to be adjusted. For example, the frequency f allows the penetration depth of the alternating electromagnetic field into the at least one treatment element shaft to be adjusted. Preferably, the alternating electro-magnetic field penetrates into the heating layer substantially exclusively or predominantly. The inductive heating device and the energy supply device are operated in particular at a frequency f, the frequency f being such that $1\ kHz \leq f \leq 50\ kHz$, in particular $5\ kHz \leq f \leq 45\ kHz$, and in particular $10\ kHz \leq f \leq 40\ kHz$ and/or
$140\ kHz \leq f \leq 360\ kHz$, in particular $150\ kHz \leq f \leq 350\ kHz$, and in particular $160\ kHz \leq f \leq 340\ kHz$.

A screw machine comprising a temperature measuring sensor configured to measure a temperature of the material to be processed and a control device configured to control the inductive heating device in response to the measured temperature of the material to be processed ensures a controlled temperature increase of the material to be processed in a simple manner. Via the temperature, measured by means of the temperature measuring sensor, of the material to be processed, the power of the inductive heating device can be adjusted in response to said measured temperature. For example, the control device compares the measured temperature with a desired nominal temperature required to melt the material to be processed, and changes the power of the inductive heating device, if necessary. The control device in particular adjusts a frequency f and/or an amplitude of an alternating voltage and/or of an alternating current used to operate the inductive heating device. For example, the inductive heating device comprises an energy supply device with a frequency converter.

The invention is further based on the object of providing a method that allows a temperature increase of material to be processed in a simple and efficient manner. In particular, the invention is intended to allow a heating of the material to be processed until it melts.

This object is achieved according to the invention by a method for the processing of material to be processed, the method comprising the steps of providing a screw machine according to the invention, feeding a material to be processed into the at least one housing bore, heating the at least one treatment element shaft by means of the inductive heating device, and heating the material to be processed on the at least one heated treatment element shaft, in particular until the material has molten at least partly in the heating zone. The advantages of the method according to the invention are the same as the advantages, already described above, of the screw machine according to the invention. In particular, the method according to the invention can be further developed such as to have the features of the screw machine according to the invention.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 6 is an enlarged view of a multi-shaft screw machine according to a third exemplary embodiment in the region of an inductive heating device.

DESCRIPTION OF THE PREFERRED EMBODIMENTS

Figure 1:
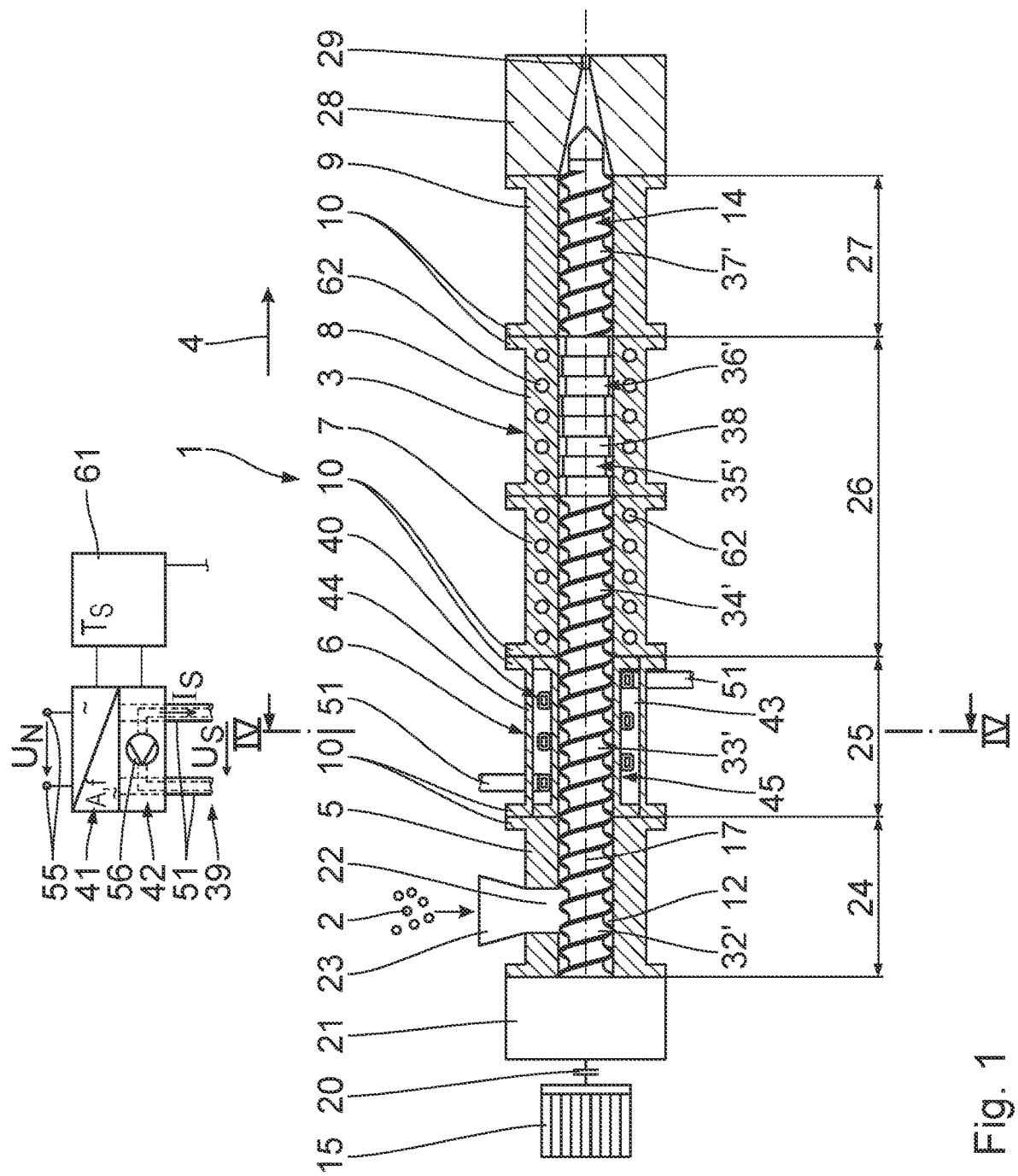
FIG. 1 is a partly sectional view of a multi-shaft screw machine according to a first embodiment for the processing of material to be processed.

A first exemplary embodiment of the invention will hereinafter be described with reference to FIGS. 1 to 4. A multi-shaft screw machine is used for the processing of a material 2 to be processed. The material 2 to be processed is a plastic material, for example.

The screw machine 1 has a housing 3 made of a plurality of housing portions 5 to 9, also referred to as housing units, arranged in succession in a conveying direction 4 of the plastic material 2. The housing portions 5 to 9 are connected to each other via flanges 10 arranged at the ends thereof in such a way as to form the housing 3.

In the housing 3, two housing bores 11, 12 are formed, which are parallel to one another and penetrate one another in such a way as to have the shape of a horizontal Figure eight when seen in cross-section. In the housing bores 11, 12, two treatment element shafts 13, 14 are arranged concentrically, which are drivable for rotation about associated rotational axes 16, 17 by means of a drive motor 15. The treatment element shafts 13, 14 are driven about the rotational axes 16, 17 in the same direction, i.e. in the same rotational directions 18, 19. A coupling 20 and branching gear unit 21 are arranged between the drive motor 15 and the treatment element shafts 13, 14.

In the first housing portion 5 adjacent to the branching gear unit 21, a feed opening 22 is formed through which the plastic material is feedable into the housing bores 11, 12. For the feeding through the feed opening 22, a material feeder 23 configured as a hopper is arranged on the first housing portion 5.

The screw machine 1 has an inlet zone 24, a heating zone 25, a homogenizing zone 26 and a pressure build-up zone 27, which are arranged in succession in the conveying direction 4. At the last housing portion 9, the housing 3 is closed by a nozzle plate 28 provided with a discharge opening 29.

The treatment element shafts 13, 14 are formed by shafts 30, 31 and treatment elements 32 to 37 or 32' to 37', respectively, arranged thereon. The treatment elements 32 to 37 arranged on the first shaft 30 and the treatment elements 32' to 37' arranged on the second shaft 31 correspond to each other, with the reference numerals of the treatment elements 32' to 37' arranged on the second shaft 31 having an additional ', allowing them to be differentiated from the treatment elements 32 to 37 arranged on the first shaft 30.

The treatment elements 32 to 37 and 32' to 37' are configured as closely intermeshing pairs, in other words the engage one another. The treatment elements are configured as screw elements 32, 32' and 33, 33' in the inlet zone 24 and in the heating zone 25. In the homogenizing zone 26 arranged downstream thereof, the treatment elements are configured as screw elements 34, 34' and kneading elements 35, 36 as well as 35', 36'. Each of the kneading elements 35, 36 and 35', 36' is configured as a kneading block, in other words they are configured in one piece. The kneading elements 35, 36 and 35', 36' each have a plurality of kneading disks 38, 38', which are arranged at an angular offset to each other and are connected to each other. In the pressure build-up zone 27, the treatment elements are again configured as screw elements 37, 37'.

The treatment elements 32 to 37 and 32' to 37' are arranged on the associated shafts 31, 31 in non-rotational manner. To this end, the shafts 30, 31 have an outer profile A that engages a corresponding inner profile I of the treatment elements 32 to 37 and 32' to 37'.

In order to melt the plastic material 2 in the heating zone 25, the screw machine 1 has an inductive heating device 39. The inductive heating device 39 comprises a coil 40, an associated energy supply device 41 and a cooling device 42.

The coil 40 is arranged in a receiving space 43 formed in the housing portion 6. The housing portion 6 located in the heating zone 25 will hereinafter also be referred to as heating zone housing portion. The housing portion 6 has an outer part 44 in which an inner sleeve 45 is arranged. The outer part 44 is configured as an outer jacket. The outer jacket 44 and the inner sleeve 45 define the receiving space 43. The flanges 10 are formed on the outer jacket 44 at the ends of the housing portion 6 while the housing bores 11, 12 are formed in a first inner sleeve portion 46 extending in the conveying direction 4. At the ends of the first inner sleeve portion 46, two inner sleeve portions 47, 48 are formed, which extend in a direction transverse to the rotational axes 16, 17 and seal the receiving space 43 at the ends thereof. Preferably, the inner sleeve 45 is secured in the outer jacket 44 by means of the second inner sleeve portions 47, 48, for example by an interference fit.

The coil 40 has a longitudinal center axis 49 and defines an inner space 50. The longitudinal center axis 49 extends essentially parallel to the rotational axes 16, 17 such that the treatment element shafts 13, 14 run through the inner space 50 of the coil 40. The coil 40 therefore surrounds the treatment element shafts 13, 14 in the heating zone 25.

The coil 40 comprises a conductor 51 in the usual manner, the conductor 51 being wound to form the coil 40 with a plurality of windings. The conductor 51 comprises a material of good electrical conductivity such as aluminum or copper. In the conductor 51, a coolant duct 52 is formed, which is part of the cooling device 42. The conductor 51 is guided out of the coil 40 via through-openings 53, 54 formed in the outer jacket 44 at the ends of the coil 40. Outside the housing portion 6, the coolant duct 52 is connected to a coolant pump 56 provided to deliver a coolant through the coolant duct 52. The coolant pump 56 is part of the cooling device 42. Preferably, water is used as coolant.

The coil 40 is connected to the energy supply device 41, which supplies the coil 40 with an alternating voltage $U_S$ and/or an alternating current $I_S$ with an adjustable frequency f and/or an adjustable amplitude A. The energy supply device 41 is in particular a frequency converter. The energy supply device 41 is connected, via terminals 55, to a mains power supply that provides a mains voltage $U_N$.

Heating the plastic material 2 is carried out by means of the treatment elements 33 and 33'. For simple and efficient heating, the treatment elements 33, 33' have a three-layer design. An inner torque transmitting layer 57 is surrounded by an insulating layer 58, which in turn is surrounded by an outer heating layer 59. The insulating layer 58 of the respective treatment element 33, 33' thermally insulates the associated heating layer 59 from the associated torque transmitting layer 57 and the associated shaft 30 or 31, respectively. To this end, the respective insulating layer 58 is provided over the entire circumference and the entire length of the torque transmitting layer 57. The respective insulating layer 58 therefore surrounds the associated rotational axis 16 or 17, respectively. The respective heating layer 59 forms a surface of the treatment element 33 or 33'.

In order to form the layers 57 to 59, the treatment elements 33, 33' are made of a metal ceramics composite material. The respective torque transmitting layer 57 is made of a first metal $M_1$ while the respective heating layer 59 is made of a second metal material $M_3$, whereas the respective insulating layer 58 arranged therebetween is made of a ceramic material $M_2$. Material $M_1$ is a steel, for example, as steel possesses a suitable mechanical strength. Contrary thereto, material $M_2$ is thermally and electrically non-conductive and non-magnetic, in other words it is electromagnetically transparent. Material $M_3$ is ferrous, i.e. a steel, for example, so eddy currents induced by means of the inductive heating device 39 may produce eddy current losses by means of which the heating layers 59 can be heated to a desired heating temperature $T_H$. Furthermore, the alternating magnetic field of the inductive heating device 39 causes hysteresis losses to develop in the ferrous material $M_3$, resulting in an additional temperature increase of the heating layers 59.

The inner sleeve 45 is made of an electromagnetically transparent material $M_4$. The electromagnetically transparent material $M_4$ is non-magnetic and electrically non-conductive. This prevents a temperature increase of the inner sleeve 45 caused by the alternating magnetic field of the inductive heating device 39. Material $M_4$ is preferably a ceramic material. Material $M_4$ is an oxide ceramic fiber-reinforced composite, for example. An oxide ceramic fiber-reinforced composite combines properties of a metal with those of a ceramics, such as electromagnetic transparency, electric and thermal insulating ability, ductile and non-brittle breaking behavior, high tensile and bending stiffness, thermal shock resistance and high temperature stability up to temperatures above 1300° C.

In the inner space 50, the heating zone housing portion 6 is made exclusively of the non-magnetic and electrically non-conductive material $M_4$. The portion of the inner sleeve 54 located in the inner space 50 is made exclusively of the non-magnetic and electrically non-conductive material $M_4$.

As the outer jacket 44 is arranged outside the coil 40, only low eddy currents are induced in the outer jacket 44 by the alternating magnetic field. The outer jacket 44 is therefore made of a metal material $M_5$. Preferably, the other housing portions 5 and 7 to 9 are made of the metal material $M_5$ as well. The metal material $M_5$ is in particular a steel. Alternatively, the outer jacket 44 may be made of the material $M_4$ as well. This prevents a temperature increase of the outer jacket 44 substantially completely.

In order to measure a temperature $T_K$ of the plastic material 2, the screw machine 1 has a temperature measuring sensor 60. The temperature measuring sensor 60 is arranged on the housing portion 7 at the beginning of the homogenizing zone 26, for example. The temperature measuring sensor 60 is in signal communication with a control device 61 used to control the screw machine 1 and in particular the inductive heating device 39. To this end, the control device 61 is in particular in signal communication with the energy supply device 41 and the cooling device 42. The control device 61 is in particular used to control the inductive heating device 39 in response to the measured temperature $T_K$.

The screw machine 1 further has a cooling device, which comprises cooling ducts 62 formed in the housing portions 7 and 8. The cooling ducts 62 allow delivery, by means of a coolant pump not shown in more detail, of a coolant in the usual manner. The coolant is in particular water. If necessary, cooling ducts 62 can also be formed in the outer jacket 44 of the housing portion 6.

The inner sleeve 45 has a thickness D in regions B adjacent to the conductor 51 and perpendicular to the rotational axes 16, 17, with 5 mm≤D≤50 mm, in particular 10 mm≤D≤40 mm, and in particular 15 mm≤D≤30 mm. Along the rotational axes 16, 17, the inner sleeve 45 is supported against the outer jacket 44 on two support positions $S_1$ and $S_2$. The support positions $S_1$ and $S_2$ are formed by the second inner sleeve portions 47, 48.

Preferably, the conductor 51 has a non-round cross-sectional shape. The cross-sectional shape is at least partly linear. For example, the conductor 51 has a rectangular cross-sectional shape. Preferably, the conductor 51 abuts against the inner sleeve 45 with a linear long side of the cross-sectional shape.

The functioning of the screw machine 1 is as follows:

Via the feed opening 22, powdery or pelletized plastic material 2 is fed into the inlet zone 24 of the screw machine 1. In the inlet zone 24, the plastic material 2 is conveyed in the conveying direction 4 up to the heating zone 25.

Figure 2:
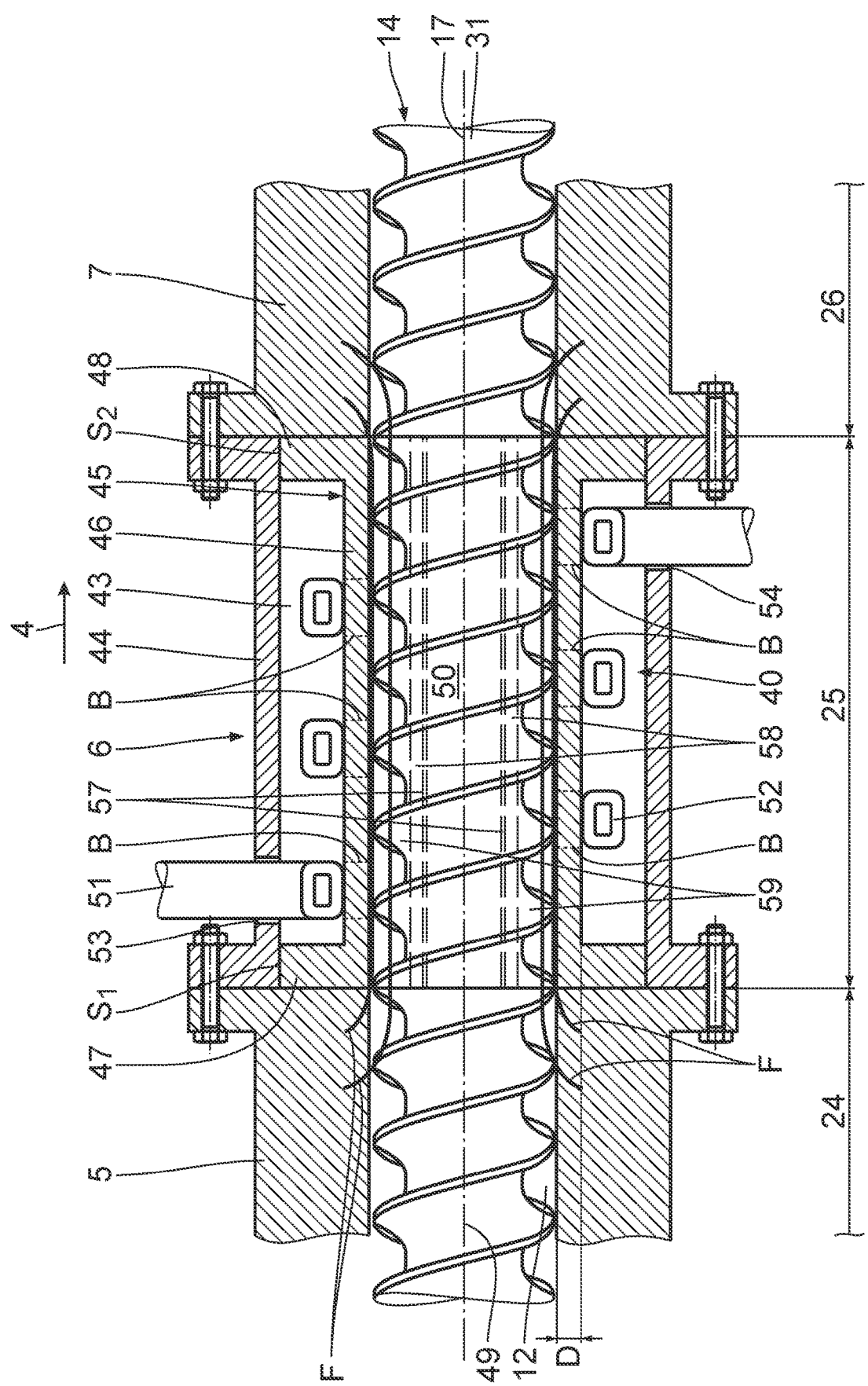
FIG. 2 is an enlarged view of the multi-shaft screw machine in FIG. 1 in the region of an inductive heating device.
Figure 3:
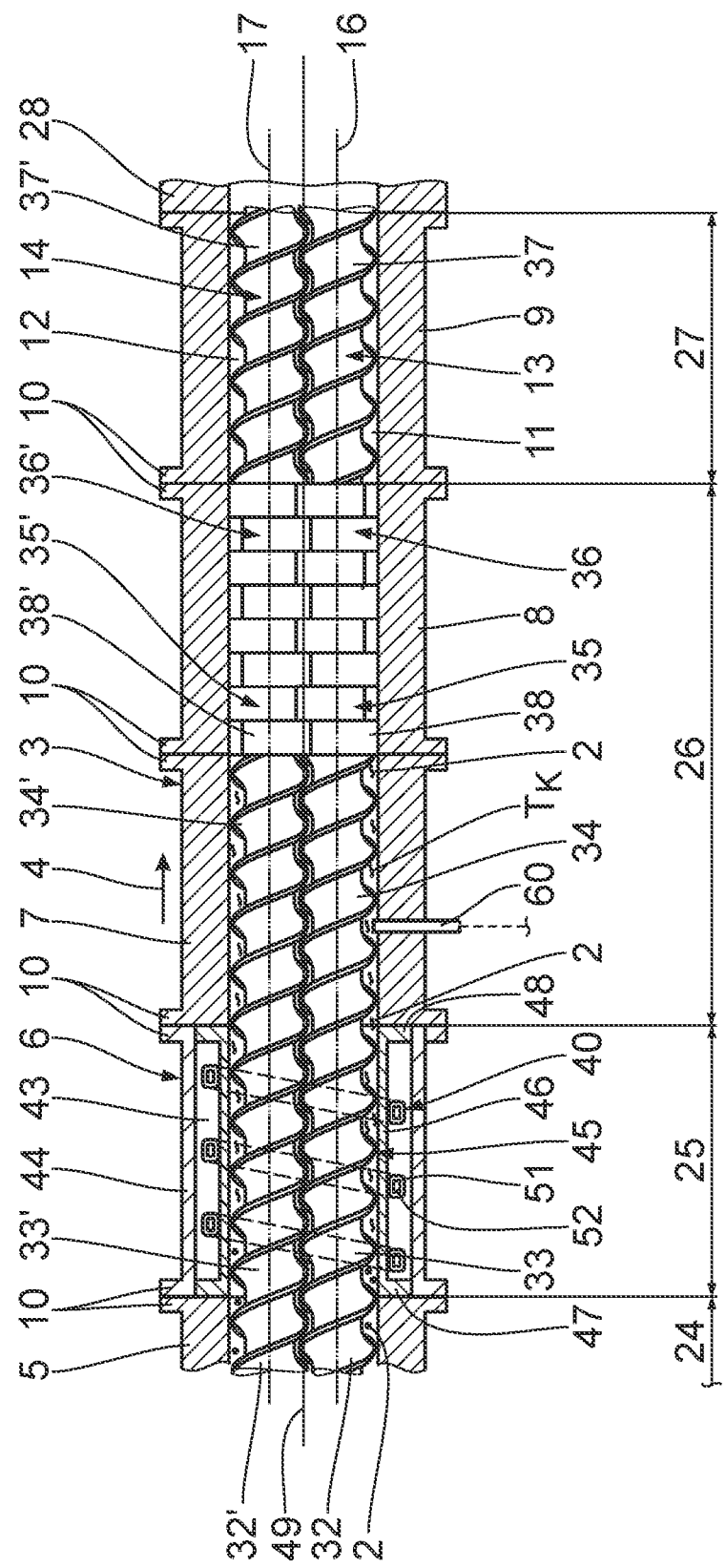
FIG. 3 is a partly sectional plan view of the multi-shaft screw machine in FIG. 1.
Figure 4:
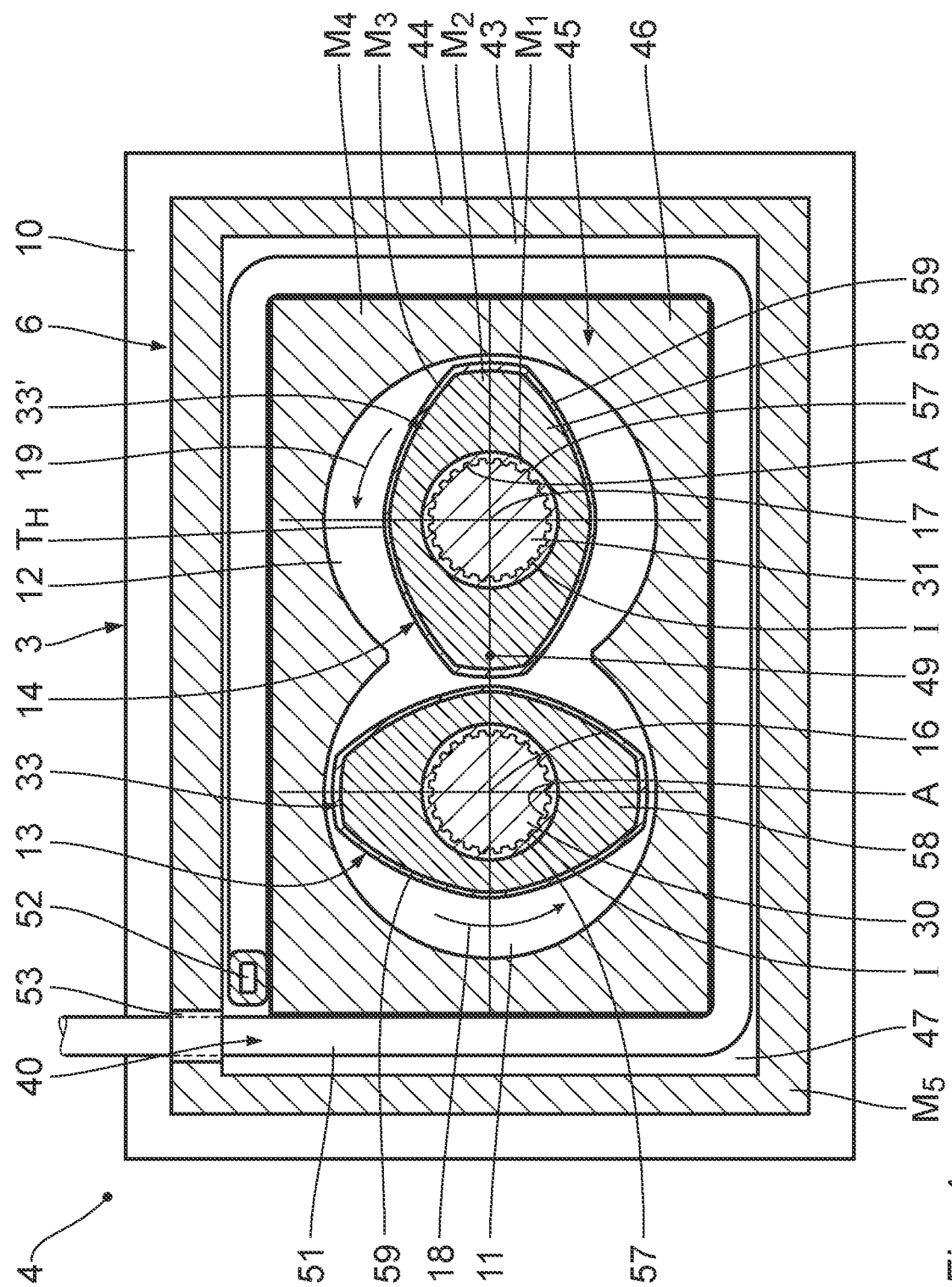
FIG. 4 is a cross-sectional view of the multi-shaft screw machine along section line IV-IV in FIG. 1.

In the heating zone 25, the plastic material 2 is heated by means of the inductive heating device 39. To this end, the inductive heating device 39 generates an alternating magnetic field by means of the energy supply device 41 and the coil 40. The inductive heating device 39 is in particular operated at a frequency f, the frequency f in a first frequency range being such that 1 kHz<f≤50 kHz, in particular 5 kHz≤f≤45 kHz, and in particular 10 kHz≤f≤40 kHz. Furthermore, the frequency f in a second frequency range is such that 140 kHz≤f≤360 kHz, in particular 150 kHz≤f≤350 kHz, and in particular 160 kHz≤f≤340 kHz. Preferably, the inductive heating device 39 is operated in both frequency ranges alternately, with the result that various penetration depths of the alternating magnetic field are achieved. Field lines F of the alternating magnetic field are illustrated in FIG. 2. The concentration of the field lines F is high in the inner space 50 of the coil 40 so the magnetic field strength is high there. The heating layers 59 of the treatment element shafts 13, 14 further act in the manner of a core. The alternating magnetic field causes eddy currents to be induced in the heating layers 59, the eddy currents producing ohmic eddy current losses. Furthermore, the alternating magnetic field causes hysteresis losses to develop in the heating layers 59. The ohmic eddy current losses and the hysteresis losses lead to a temperature increase of the heating layers 59 to the heating temperature $T_H$. The heating temperature $T_H$ can be changed via the frequency f and/or the amplitude A. Due to the close contact of the plastic material 2 with the treatment element shafts 13, 14, the plastic material 2 is heated by the heating layers 59. The heat generated in the heating layers 59 is therefore transferred to the plastic material 2, causing the temperature thereof to increase in the heating zone 25 up to the temperature $T_K$. The temperature $T_K$ is in particular above a melting temperature of the plastic material 2, causing the solid plastic material 2 to melt at least partly in the heating zone 25.

As the inner sleeve 45 is made exclusively of the electromagnetically transparent material $M_4$, which is non-magnetic and electrically non-conductive, the alternating magnetic field does not produce a temperature increase of the inner sleeve 45. The energy provided by the inductive heating device 39 is therefore introduced into the plastic material 2 in a simple and efficient manner via the heating layers 59 of the treatment elements 33, 33'. Furthermore, the insulating layers 58 prevent the heat generated in the heating layers 59 from being transferred in the direction of the shafts 30, 31.

The temperature $T_K$ of the plastic material 2 is measured by means of the temperature measuring sensor 60 and transmitted to the control device 61. The control device 61 compares the temperature $T_K$ with a predefined nominal temperature $T_S$, which is preferably above the melting temperature of the plastic material 2. If the temperature $T_K$ is below the nominal temperature $T_S$, then the control device 61 actuates the energy supply device 41 to increase the amplitude A and/or the frequency f. Conversely, if the temperature $T_K$ is too high, then the amplitude A and/or the frequency is reduced. As a high current $I_S$ flows through the conductor 51 of the coil 40, the conductor 51 needs to be cooled, if necessary. To this end, the cooling device 42 delivers a coolant, in particular water, through the cooling duct 52 by means of the coolant pump 56.

In the homogenizing zone 26, the plastic material 2 is homogenized and molten completely in case there is still any solid plastic material 2. If necessary, the plastic material 2 is cooled by means of a coolant, in particular water, which is delivered through the coolant ducts 26.

In the pressure-build up zone 27, the pressure of the completely molten and homogenized plastic material 2 is increased. The plastic material 2 is then discharged via the discharge opening 29.

Figure 5:
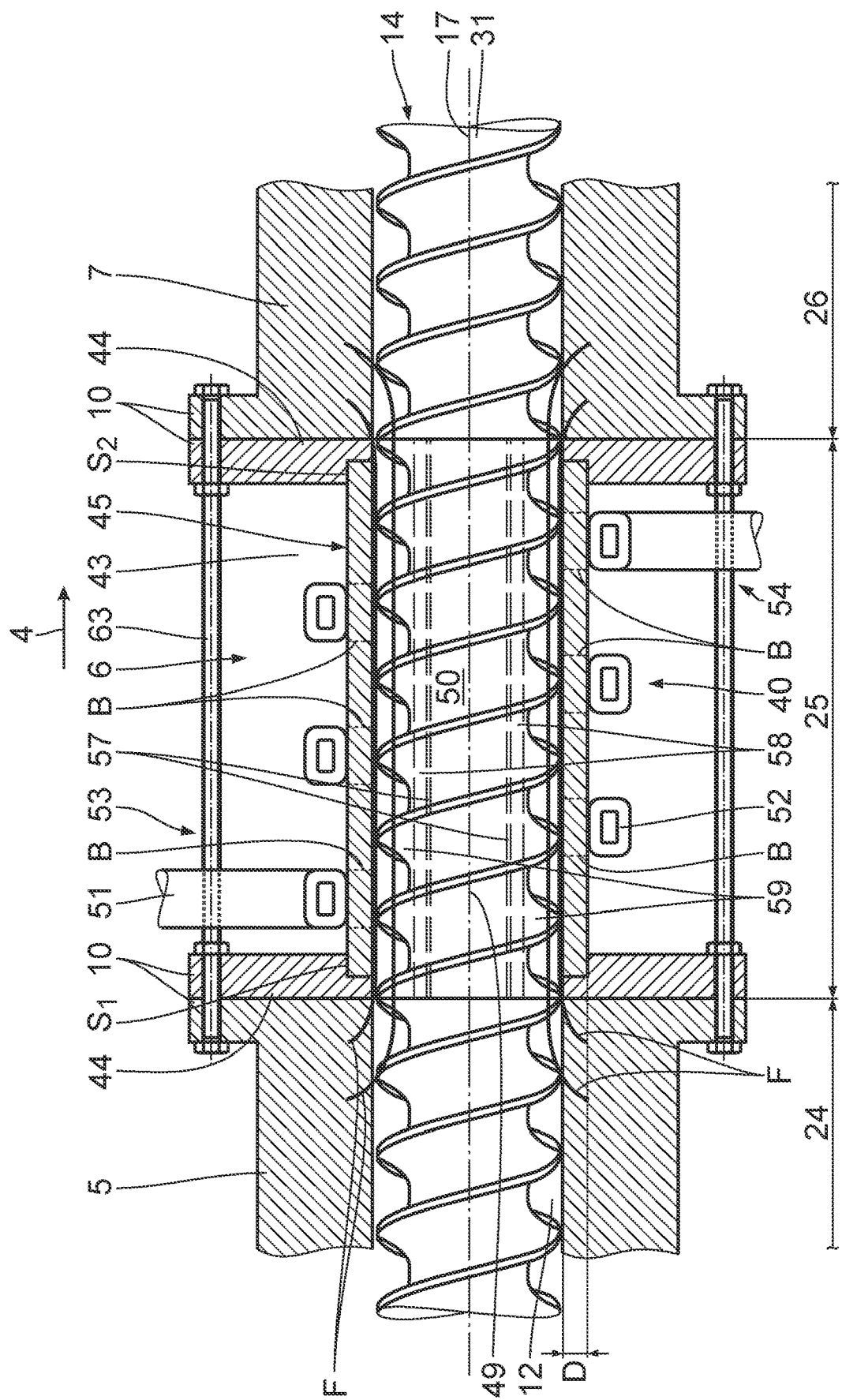
FIG. 5 is an enlarged view of a multi-shaft screw machine according to a second exemplary embodiment in the region of an inductive heating device.

A second exemplary embodiment of the invention will hereinafter be described with reference to FIG. 5. Contrary to the first exemplary embodiment, the heating zone housing portion 6 has an inner sleeve 45 the ends of which are received in two outer parts 44. The outer parts 44 are arranged outside the inner space 50. The outer parts 44 further have a plate-shaped design such as to form the flanges 10. The outer parts 44 are connected to one another by means of threaded rods 63 in such a way that a distance is provided therebetween. Furthermore, the threaded rods 63 provide a screw connection between the outer parts 44 and the adjacent housing portions 5 to 7. The receiving space 43 is therefore partly open to the outside. Between the threaded rods 63, the through openings 53, 54 for the conductor 51 are formed. Along the rotational axes 16, 17, the inner sleeve 45 is supported against the outer parts 44 on support positions $S_1$ and $S_2$. Further details concerning the design and the functioning can be found in the description of the first exemplary embodiment.

A third embodiment of the invention will hereinafter be described with reference to FIG. 6. Contrary to the preceding exemplary embodiments, an outer side of the inner sleeve 45 facing the coil 40, is formed negatively to the coil 40. The coil 40 is thus embedded in the inner sleeve 45, with the result that a helical support region or support web 64 is formed between the second inner sleeve portions 47, 48. The support web 64 is arranged between the windings of the coil 40. Due to the support web 64, the inner sleeve 45 forms a plurality of additional support positions along the rotational axes 16, 17 in addition to the support positions $S_1$ and $S_2$ at which the inner sleeve 45 is supported against the outer part 44. FIG. 6 shows an exemplary illustration of support positions $S_3$ to $S_6$ allowing the inner sleeve 45 to be supported against the outer part 44 over a large surface area thereof. Generally, the heating zone housing portion 6 may also comprise a plurality of outer parts 44 against which the inner sleeve 45 is supported. This facilitates the mounting of the heating zone housing portion 6. Further details concerning the design and the functioning can be found in the description of the preceding exemplary embodiments.

The features of the exemplary embodiments can be used in any combination.

The screw machine 1 according to the invention allows energy to be introduced into the material 2 to be processed in a simple and efficient manner by induction or heat, thus allowing a mechanical energy input to be reduced significantly, with the result that the mechanical load and the wear of the screw machine 1 are reduced significantly. The efficient energy input further allows an energy-saving operation of the screw machine 1. In relation to a total power of the screw machine 1, the inductive heating device 39 in particular has a heating power of 10% to 90%, in particular of 20% to 80%, and in particular of 30% of 70%. If necessary, the inductive heating device 39 can also be operated at a plurality of different frequencies f at the same time. This allows regions to be heated, which that are disposed at various distances, such as the circumferential heating layers 59.

The composite material of the treatment elements 33, 33' is produced by sintering or flame spraying, for example. Methods for producing composite materials or composite bodies of this type are known.

While specific embodiments of the invention have been shown and described in detail to illustrate the application of the principles of the invention, it will be understood that the invention may be embodied otherwise without departing from such principles.

The invention claimed is:

1. A screw machine comprising:
a housing comprising a plurality of interconnected housing portions arranged in succession in a conveying direction;
at least one housing bore formed in the housing;
a feed opening leading into the housing bores;
at least one treatment element shaft arranged in the at least one housing bore in such a way as to be drivable for rotation about a rotational axis;
an inductive heating device configured to form a heating zone, wherein at least one housing portion in the heating zone is at least partially made of a non-magnetic and electrically non-conductive material, the at least one treatment element shaft comprising an electrically conductive material at least in the heating zone, wherein the inductive heating device comprises at least one coil surrounding the at least one treatment element shaft, and the inductive heating device defines an inner space, and wherein only a non-magnetic and electrically non-conductive material is arranged between the at least one treatment element shaft and the at least one coil.

2. A screw machine according to claim 1, wherein the at least one housing portion in the inner space is exclusively made of the non-magnetic and electrically non-conductive material.

3. A screw machine according to claim 1, wherein the at least one housing portion comprises an inner sleeve, the inner sleeve at least partially defining the at least one housing bore in the heating zone, the inner sleeve being exclusively made of the non-magnetic and electrically non-conductive material.

4. A screw machine according to claim 1, wherein the at least one housing portion comprises at least one outer part and an inner sleeve, the inner sleeve being supported against the at least one outer part.

5. A screw machine according to claim 4, wherein the inner sleeve is supported against the at least one outer part on at least two support positions along the rotational axis.

6. A screw machine according to claim 4, wherein the inner sleeve is formed negatively to the at least one coil on an outer side facing the at least one coil.

7. A screw machine according to claim 3, wherein the at least one coil comprises an associated conductor, the inner sleeve having a thickness in a region of the conductor perpendicular to the rotational axis, wherein the thickness is greater than or equal to 5 mm and less than or equal to 50 mm.

8. A screw machine according to claim 3, wherein the at least one coil comprises an associated conductor, the conductor having a non-round cross-section, which is at least partially formed linearly in relation to the inner sleeve.

9. A screw machine according to claim 1, wherein the at least one treatment element shaft comprises a plurality of treatment elements arranged on at least one associated shaft non-rotatably and successively in the conveying direction, at least one treatment element comprising a metal heating layer, the metal heating layer forming a surface of the at least one treatment element, the at least one treatment element comprising an insulating layer, which thermally insulates the heating layer from the at least one associated shaft.

10. A screw machine according to claim 1, wherein the inductive heating device comprises at least one coil, which is coolable by a cooling device.

11. A screw machine according to claim 1, wherein the inductive heating device comprises at least one coil and an associated energy supply device, the energy supply device providing at least one of an alternating voltage and an alternating current.

12. A screw machine according to claim 1, further comprising:
a temperature measuring sensor configured to measure a temperature of the material to be processed; and
a control device configured to control the inductive heating device in response to the measured temperature of the material to be processed.

13. A screw machine according to claim 4, wherein the inner sleeve is supported against the at least one outer part on at least three support positions along the rotational axis.

14. A screw machine according to claim 4, wherein the inner sleeve is supported against the at least one outer part on at least four support positions along the rotational axis.

15. A screw machine according to claim 11, wherein the at least one of the alternating voltage and the alternating current has at least one of an adjustable frequency and an adjustable amplitude.

16. A screw machine comprising:
a housing comprising a plurality of interconnected housing portions arranged in succession in a conveying direction, said housing defining a housing bore and a feed opening extending into said housing bore;
a treatment element shaft arranged in said housing bore and configured for rotation about a rotational axis;
an inductive heating device arranged with one of said housing portions, said inductive heating device being configured to form a heating zone inside said housing bore, said inductive heating device including a coil surrounding said housing bore and said treatment element shaft, said one housing portion and said inductive heating device being formed to only have non-magnetic and electrically non-conductive material between said treatment element shaft and said coil.

* * * * *